(No Model.)

H. H. BALLARD.
BINDING CLIP.

No. 467,244. Patented Jan. 19, 1892.

Witnesses:
Mary R. Reagan
Christina Schnopp

Inventor:
Harlan H. Ballard

UNITED STATES PATENT OFFICE.

HARLAN H. BALLARD, OF PITTSFIELD, MASSACHUSETTS.

BINDING-CLIP.

SPECIFICATION forming part of Letters Patent No. 467,244, dated January 19, 1892.

Application filed October 23, 1891. Serial No. 409,632. (No model.)

*To all whom it may concern:*

Be it known that I, HARLAN HOGUE BALLARD, a citizen of the United States, residing at Pittsfield, in the county of Berkshire and State of Massachusetts, have invented a certain new and useful Improvement in Binding-Clips; and I do hereby declare that the following specification, taken in connection with the drawings forming a part of the same, is a clear, true, and accurate description thereof.

This invention relates to binding-clips for holding loose papers, pamphlets, magazines, and other articles, including covers on the same. It essentially differs from ordinary spring-clips for the purpose, which are provided with fixed handles for opening them, arranged to project backwardly from the clips, so as to be greatly in the way when the clips are in place on the articles they serve to bind; and the invention consists in a spring-clip having the handles or opening-levers attached to it by a movable instead of by a fixed joint, which may be a pivot, screw, rivet, or hinge, thus enabling the handles or opening-levers to be moved backwardly from the clip when it is desired to open the clip by their use and then be moved forward again after the clip is in place, so as to be out of the way. By means of these clips with attached but movable handles the papers or documents held by them can be placed on a shelf like an ordinary book, with no objectionable protrusion from the back.

Reference is had to the accompanying drawings, forming a part of this specification, in which similar letters of reference indicate corresponding parts in both the figures.

Figure 1:
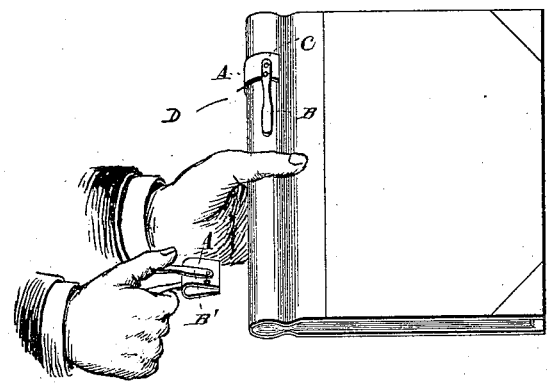

Figure 1 represents in perspective a series of papers in a cover with one of my improved clips attached to its upper portion and the attached opening-levers B moved forward, so as to be out of the way, and another clip in process of attachment, its movable levers B' being moved back in this case, so as to be used to open the spring-clip A.

These spring binding-clips, with their attached movable opening-levers, may be made of spring steel or brass and of an approximately horseshoe or U shape, with their sides inclining toward each other at their mouths to hold firmly and compactly within them whatever papers or other articles may be introduced.

Figure 2:
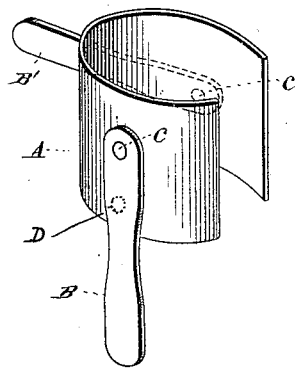

The dotted circle D in the opening-lever, Fig. 2, indicates the location of a hole or depression in the under side of said lever, adapted to fit over a suitable projection rising from the surface of the clip for the purpose of holding it firmly in position when closed down against the sides of the clip, as in the attached clip A, Fig. 1.

Having thus described my invention, what I claim as new, and desire to secure by Letters Patent, is—

1. A spring binding-clip for papers and other articles, approximately U-shaped or approaching the cylindrical form, with its members meeting or normally inclined toward each other at the mouth, and provided with levers so attached as to admit of their being moved backwardly into a position to act as opening-levers and then of being moved forward and there held by a suitable catch or spring, substantially as described, in a position such as to obviate the awkwardness and bad effects of protruding handles.

2. The combination, with the spring binding-clip A, U shape, with its members meeting or normally inclined toward each other, of levers so attached as to permit their adjustment to an open position, in which they may act as opening-levers, and also to an inactive and closed position, in which they shall be out of the way, substantially as described.

3. The within-described binding-clip, consisting of the spring A and the opening-levers B, pivoted at C and provided at D with a suitable catch to hold them firmly in position when closed, substantially as set forth.

HARLAN H. BALLARD.

Witnesses:
MARY K. REAGAN,
CHRISTINA SCHNOPF.